April 26, 1949.  C. A. FRANKENHOFF  2,468,188
CLARIFICATION OF WATER SUPPLIES

Filed June 7, 1945  3 Sheets-Sheet 1

C. A. FRANKENHOFF
INVENTOR

ATTORNEY

April 26, 1949.                    C. A. FRANKENHOFF                    2,468,188
                              CLARIFICATION OF WATER SUPPLIES
Filed June 7, 1945                                              3 Sheets-Sheet 2

C. A. FRANKENHOFF
INVENTOR

ATTORNEY

April 26, 1949.   C. A. FRANKENHOFF   2,468,188
CLARIFICATION OF WATER SUPPLIES
Filed June 7, 1945   3 Sheets-Sheet 3
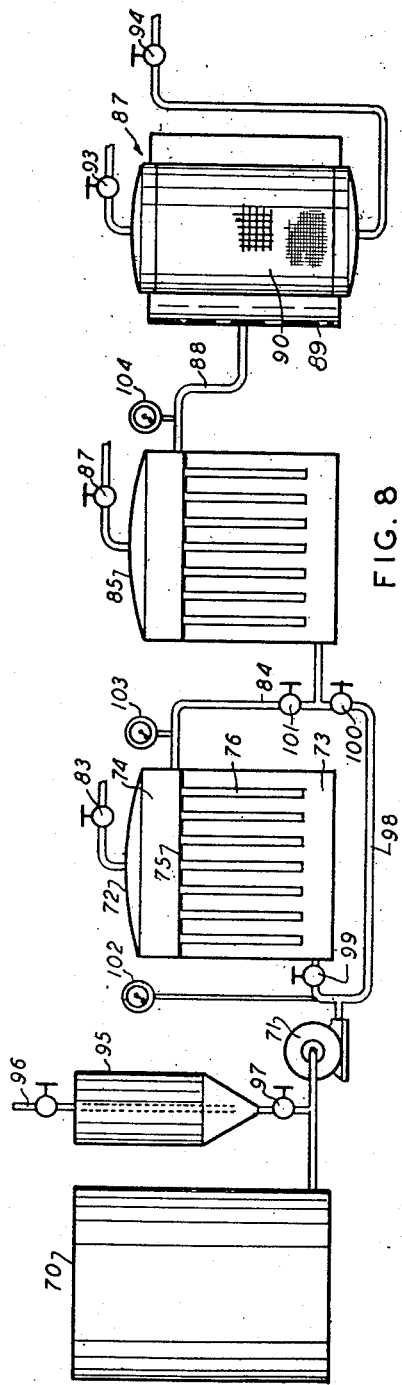
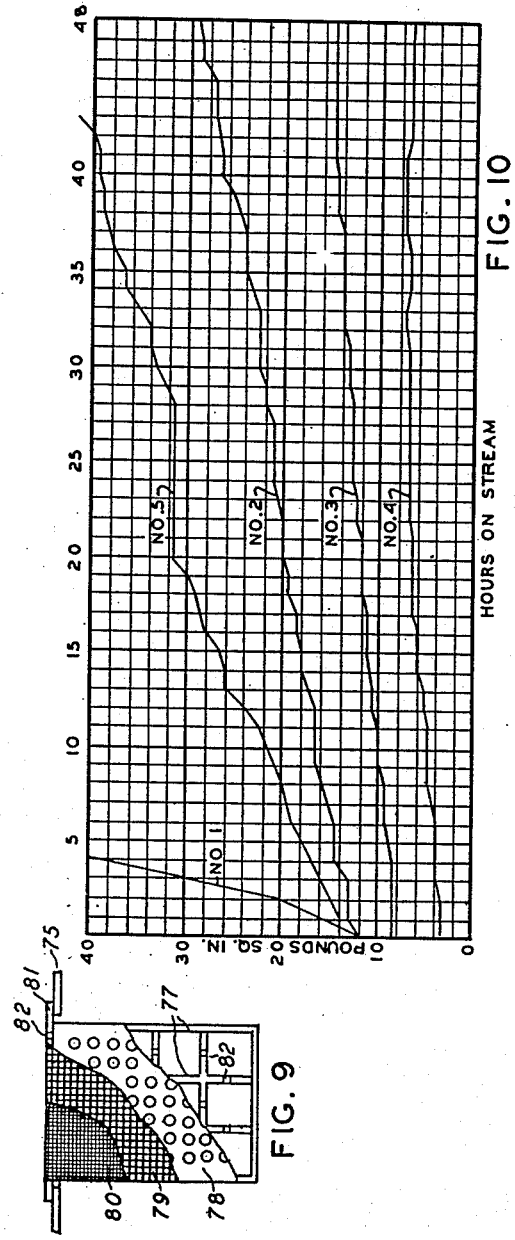
C. A. FRANKENHOFF
INVENTOR
ATTORNEY Patented Apr. 26, 1949

2,468,188

UNITED STATES PATENT OFFICE 2,468,188

CLARIFICATION OF WATER SUPPLIES

Charles A. Frankenhoff, Scarsdale, N. Y., assignor to Great Lakes Carbon Corporation, a corporation of Delaware Application June 7, 1945, Serial No. 598,006

5 Claims. (Cl. 210—16)

The instant invention relates primarily to the clarification of water in large quantities for domestic and industrial purposes and to methods and materials therefor.

The invention relates also to the intensive purification of highly contaminated waters to render them potable, as for the use of troops in the field.

The invention relates also to the clarification of boiler feed waters containing minute quantities of finely dispersed lubricating oils, specifically to render such waters fit for reuse on shipboard.

In general terms, the invention lies in simultaneously introducing into a stream of the water to be clarified minute amounts of a diatomaceous earth filter-aid and of a salt forming a flocculent precipitate in the presence of basic substances, in thus producing a precipitate in which the earth particles are coated with insoluble gelatinous matter, and in passing the stream through a filter on which the precipitate is built up into a free filtering cake having an abnormally high clarifying power, the water stream emerging from the filter in a high degree of purity.

It is old practice to add salts of iron or aluminum to water for the purpose of producing a flocculent precipitate therein, and thereafter to filter out the floc in sand beds, usually after settling the major portion of the floc in sedimenting basins. This method is effective where space and weight are not a consideration, producing a degree of clarification which is sufficient for most industrial and domestic purposes. It is useless, however, for any service in which portability is required because of the space required and the great weight of the sand beds, which have a very low unit capacity where gravity flow is used. Any attempt to apply pressure to the water to increase the throughput of the sand bed results in the carrying of floc through the filter, thus destroying the clarity of the filtrate. Nor can these flocs be filtered out on twill or other filtering cloths as they glaze over and seal the cloth almost immediately after the establishment of a clear filtrate.

It is also well known to filter many aqueous liquids with the use of a diatomaceous earth filter-aid. This practice is highly efficacious where the quantity of liquid to be clarified is moderate and the cost of filtration is justified by the value of the liquid, but has been recognized as wholly impracticable for the purification of domestic and industrial waters. Those filter-aids which are sufficiently free flowing to be employed for this purpose do not remove the finer sediments such as colloidal clays, dispersed oil or colloidal organic matter, while such as yield a clear filtrate have a flow rate so limited as to require a filtration plant too costly to be practicable for industrial or community waters.

I have discovered that by combining the use of flocculating salts with the use of diatomaceous earth filter-aids, in a certain specific manner about to be described, I can so increase the relation between flow rate and clarifying power of the filter-aids as to render their use for this purpose economically feasible and highly attractive.

The salts used for this purpose may be any of the water-soluble salts of iron, aluminum or chromium, all of these salts yielding flocculent precipitates when added to water containing traces of basic substances. For practical purposes it is desirable to choose between the sulfates of aluminum and of ferrous iron, these salts yielding the most voluminous precipitates at the least cost.

The diatomaceous earth filter-aid selected for this purpose should be a grade having a relatively high flow-rate. The effect of the aluminum salt, as will be described, is greatly to enhance the clarifying power with only a moderate reduction in flow-rate. Thus a high throughput per square foot of filtering surface, without sacrifice of clarity, is obtained in the use of an earth having initially a high flow rate. The grade of earth known commercially as "Dicalite Speedex" is well adapted to this use, or an even more free-flowing grade may be used.

The relationship between the quantities of salt and of earth to be added to the water are subject to some variation, being influenced to some extent by the characteristics of the particular grade of earth employed. A very free-flowing earth having relatively low inherent clarifying power will require a greater proportion of the salt than an earth having initially a lower flow rate. Ordinarily the weight of salt, figured as water-free aluminum sulfate, will be from 0.5% to 3.0% of the total weight of solids added.

The relation between the total quantity of additive and the weight of water clarified will vary with the nature of the suspensoids to be removed and, to a lesser extent, with the quantity of suspended matter. The coarser suspensoids are removed without difficulty, whatever their quantity, by the mere straining action of the filter cake, while the colloids must be entrapped and adsorbed by the gelatinous coatings on the diatoms of which the cake is composed. It is impossible, therefore, to recite any dosage which will be sufficient for the clarification of an unknown water, but it has been shown that a dosage of as much as 1 pound of total additive per 1,000 gallons may be required to bring a water rendered highly turbid by an admixture of bentonite to a condition of zero turbidity (absolute brilliance), this 1 pound consisting of 0.02 pound of aluminum sulfate and 0.98 pound diatomaceous earth. On the other hand, waters rendered turbid by the more common clays and silts may be brought to a fully satisfactory clarity for domestic or industrial use with as little as $\frac{1}{10}$ pound per thousand gallons of the above additive.

It should be understood that the desirable results attained with this method will not be had if the aluminum salt is added to the water a sufficient time in advance of the earth to allow the floc to form fully and to begin to settle. The method is not a mere filtration of floc from an alum treated water by the use of a filter-aid. That method will produce a clear water but entails a large increase in the consumptions of both salt and earth and material reductions in the rate of filter flow and in length of filtration cycle. On the contrary, the method requires the substantially simultaneous addition to the water of the two components of the additive in order that the gelatinous aluminum or iron hydroxide may be precipitated on the individual particles of which the filter-aid is composed. It is this floc-coated earth which is effective for clarification to an extent and at a rate not heretofore attained.

In the ensuing descriptions reference will be made to the appended drawings showing various methods of introducing the active agents into the water stream and of conducting the filtration step to the best advantage. In these drawings Fig. 1 illustrates diagrammatically a system in which the earth and the salt are mixed in advance, in proportioned quantities, and fed into the water stream as a dry mixture;

Fig. 2 is a flow sheet of a system in which the mixed agent is brought to the form of an aqueous slurry before being introduced into the water stream;

Fig. 3 similarly illustrates a system in which the agents are separately fed into the water stream;

Fig. 8 is a diagram of an installation particularly adapted to the clarification of boiler feed water, shown in elevation;

Fig. 9 is a face elevation of one of the filtering elements 76 of Fig. 8, with portions of the filtering and supporting media removed, and Fig. 10 illustrates by means of time v. pressure curves the behavior of the agents of the invention when used to clarify boiler feed water.

Figure 1:
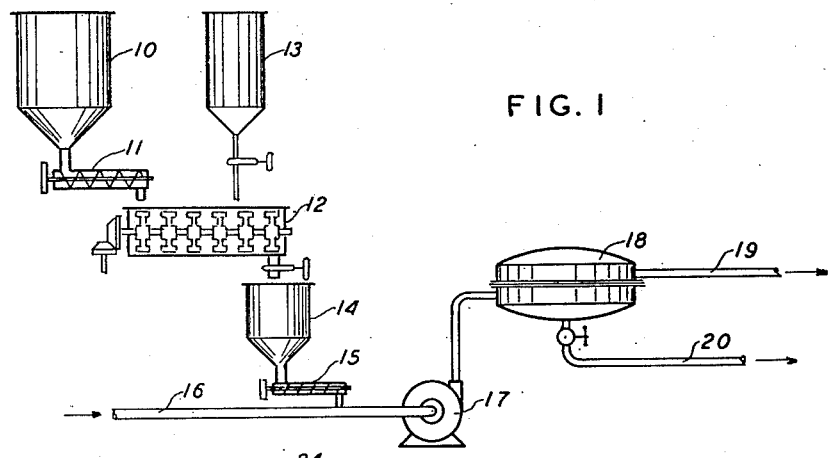

Referring first to Fig. 1, dry comminuted earth is drawn from a bin 10 by a measuring device such as a scroll feeder 11 into a mixing trough 12 provided with paddles. A weighed quantity of the salt, in the form of a dry powder, is drawn from a bin 13 to give a mixture of the desired proportions. The batch is then thoroughly blended and drawn into a leeway bin from which it is fed at a measured rate by another scroll 15 arranged to be rotated at an accurately controlled rate, into a conduit 16 through which the water to be clarified is flowing. This conduit leads to the suction of a pump 17 in which the earth mixture is intimately dispersed throughout the water, which then passes to a filter 18 in which the suspensoids are removed from the water and collected as a filter cake. The clarified water is delivered through a conduit 19 and at necessary intervals the cake is washed down and discharged through conduit 20 in the form of a slurry, as will later be described.

This method may be modified by introducing the salt to the earth in the form of a saturated solution, permitting the quantity added to the mixing trough to be gauged instead of weighed. The quantity of water so added to the earth may be neglected unless the proportion of salt is relatively large, in which case a light drying effect may be produced by gently heating the mixer after blending.

The advantage in this step of mingling the constituents of the combined agent is to permit the separation of the step of blending from those of use, the mixture being subject to storage and transportation. It is highly convenient where the clarifying operation is conducted on a moderate scale and is almost essential in confined spaces, as on shipboard, but is poorly adapted to large scale operations such as the clarification of community water supplies.

Figure 2:
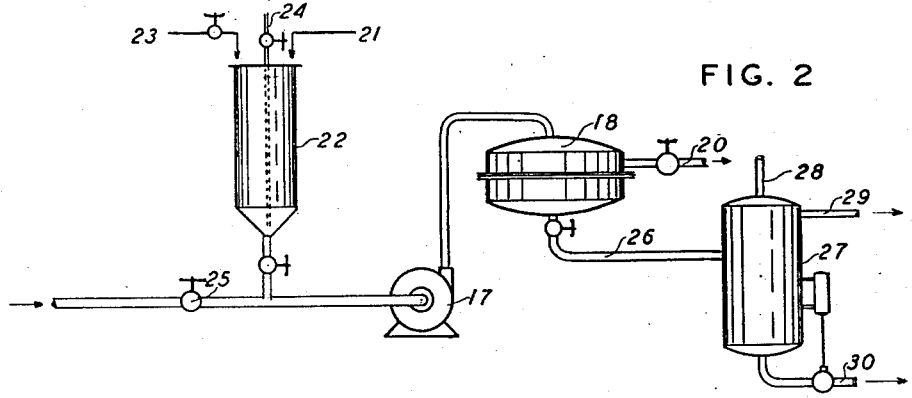

A modification of the above method which is particularly adapted to the clarification of condensed water containing finely dispersed steam cylinder lubricants is illustrated in Fig. 2. The dry agents, either premixed or in proportioned quantities, are introduced as at 21 into a slurry tank 22 supplied with water as at 23 and provided with an air blast 24 or other means for agitating the contents. In this tank the dry agent is brought to the condition of a slurry, which is then pumped into the filter to form a precoat of desired thickness, a valve 25 being provided to shut off the water supply during precoating. The slurry is then followed through by water containing suspended oil, which for a considerable time will emerge oil free and brilliant.

After a time which varies with the thickness of the cake and the rate of flow the cake will become saturated with suspended oil, which will thereafter emerge from the cake in the form of floating droplets of appreciable size, the water in which these droplets are suspended being still brilliant. The mixed stream of water and oil drops is delivered through a conduit 26 into a gravity separator 27 which should be provided with a gas vent 28, an oil overflow 29 and a water drain 30. In the absence of solid suspensoids the treated cake so established will deliver free oil and perfectly clear water for a long time without recharging.

Figure 3:
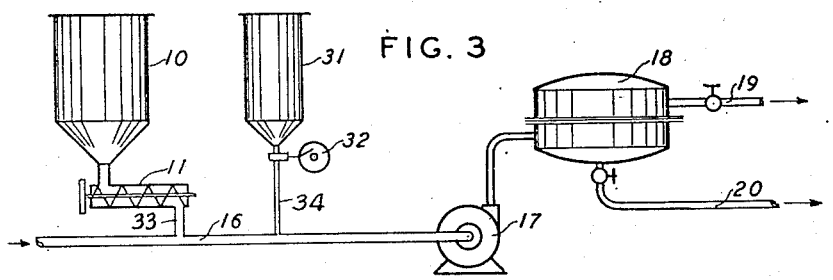
Figure 4:
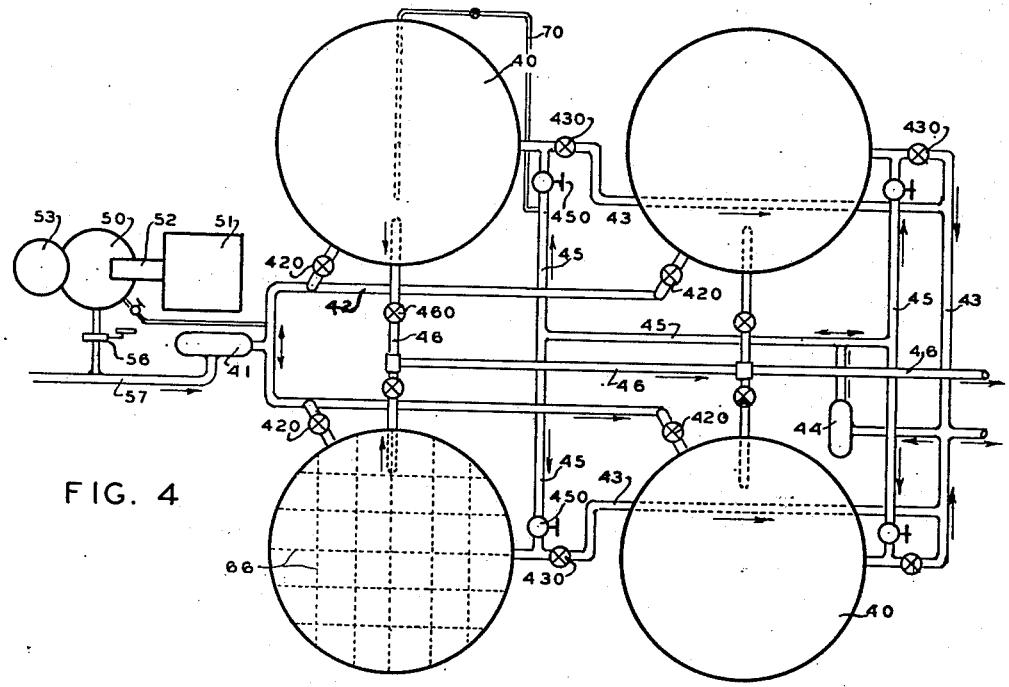
Fig. 4 illustrates in plan and Fig. 5 in elevation a more complete assemblage of apparatus for handling large volumes of water for domestic or industrial purposes.
Figure 5:
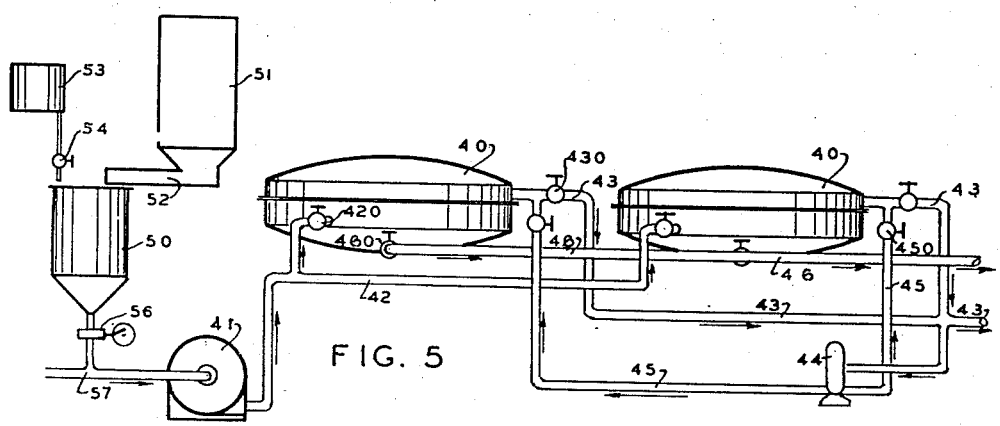

A modification adapted to the clarification of water in large quantities is illustrated in the flow diagram of Fig. 3. The filter-aid stored in bin 10 is fed directly into water supply conduit 16 by scroll feeder 11. A standardized salt solution is fed at a controlled rate into conduit 16 from a supply tank 31, as by means of a measuring pump 32. The remainder of the system is as described in connection with Fig. 1, the feed of agents being continuous throughout the length of the filtering cycle, as in the first instance.

Difficulties in feeding dry earth into a flowing stream of water may be avoided by bringing the two agents into the condition of a thin slurry, as described in connection with Fig. 2, and measuring the supply of slurry into the water stream. In Fig. 3 the relative positions of conduits 33 and 34, which convey the agents into the water conduit, may be reversed from that shown.

Figs. 4 to 7 inclusive illustrate an assemblage of apparatus adapted to the continuous clarification of large volumes of water, as for municipal purposes.

A plurality of filters 40, not less than three and preferably a considerably larger number, are connected in parallel to the discharge of a supply pump 41 by means of a branched conduit 42, the branches discharging into the lower chamber of each filter. A branched offtake conduit 43 connects the upper chambers of the filters with a place of disposition of the clarified water; e. g., a pipeline, tank or reservoir.

A second pump 44 has its suction side connected with clarified water main 43 and has its discharge side connected through a branched conduit 45 with the upper chamber of each filter.

A branched conduit 46 connects the lower chamber of each filter with a place of disposition of spent filter cake slurry. Each branch of each conduit is provided with a stop valve, as indicated at 420, 430, 450 and 460.

A slurry tank 50 is fed with a measured stream of filter-aid from a bin 51 by a screw feeder 52, and with a solution of aluminum sulfate or other flocculating salt from a tank 53 through a valved pipe 54. A controlled stream of water, which may be taken from conduit 42, is fed continuously into tank 50 through valved pipe 55. The relation of the filter-aid and water feeds is such as to maintain the contents of the tank in the form of a thin slurry, while the feed of salt solution is proportioned to the earth feed in a desired relation. A measuring pump 56 introduces a stream of the earth-salt slurry into water supply conduit 57 which enters the suction side of pump 41 to feed the system with the turbid water to be clarified.

Figure 6:
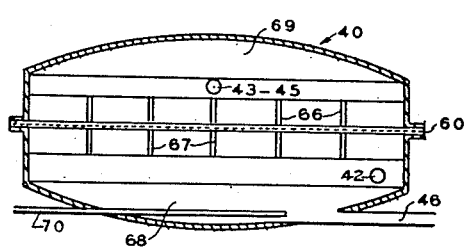
Fig. 6 is a vertical section through one of the filters 40 of Figs. 4 and 5.
Figure 7:
Fig. 7 is a section through a fragment of the actual filtering element 60 of Fig. 6.

The form of filter illustrated in these figures, and which will be understood to the illustrative only, is shown in more detail in Fig. 6. This device consists of two relatively short rings provided with curved heads and mating flanges, which may be held together by clamps or bolts not shown. Between these flanges, and extending across the area of the filter, is the filtering element 60 which is detailed in Fig. 7. This assembly consists, in descending order, of a stiff, perforated plate 61, a coarse mesh screen of heavy wire 62 (e. g., ¼" #16 wire), a screen 63 of finer wire (e. g., 16 mesh #22), a filter cloth 64 of suitable fabric (e. g., Parma twill), and a supporting layer 65 of the stiff screen. These elements are sealed between the flanges at their edges by soft gaskets and are supported against distortion in use by grids 66 and 67 of steel plate attached to the rings.

Water containing earth and other suspensoids enters the lower chamber 68 through conduit 42, valve 420 being open, and passes upwardly through filtering element 60, depositing its solids in the form of a cake on the lower face of the filtering element. The filtered water leaves upper chamber 69 through conduit 43, valve 430 being open. This flow continues until the thickness of the accumulated cake becomes such as to reduce the flow rate unduly, which with average water will be a matter of many hours.

When this stage is reached, valves 420 and 430 are closed and valves 450 and 460 are opened. Clarified water now enters the upper chamber from discharge conduit 43, which is always under some pressure and filled with water discharged by the other filters of the battery. The pressure thus thrown on the upper side of the filtering element dislodges the cake, which falls to the bottom of the lower chamber and is flushed out as a slurry by a water jet introduced through pipe 70.

In this cycle the cloth is not disturbed and will last a long time without cleaning or replacement. In the use of a plurality of filters in parallel, all but one of the elements will be in operation at all times and a single attendant, having only to switch valves, can care for a group consisting of numerous filters.

The remarkable clarifying power of this combination of diatomaceous earth filter-aid and flocculating salt, as compared with that of either agent alone, is shown by the results of the following laboratory experiments:

(1) A quantity of a municipal water containing a trifling quantity of mineral suspensoids and an appreciable quantity of organic matter was dosed with Wyoming bentonite in the proportion of 50 parts per million. This bentonite is a colloidal solid and its suspension in the above water is heavily turbid and practically stable, showing no tendency to settle out even on long standing. This suspension, which offers a very difficult filtering problem was used in all the following tests. As a blank, a quantity of this suspension was filtered through a small cloth disc under a low head, and the quantity of filtrate collected during a fixed time (21 minutes) was measured and calculated to gallons per hour per square foot filtering surface.

(2) Samples of this suspension were treated with various proportions of an agent containing 97.5% of a high flow-rate diatomaceous earth filter-aid and 2.5% of aluminum sulfate $(Al_2(SO_4)_3)$. The water containing the agent in suspension was then filtered under conditions identical with those observed in experiment 1, the flow-rate calculated and the turbidity determined photo-electrically. This turbidity figure was translated to parts per million of the same bentonite by reference to an experimentally determined curve obtained by progressively diluting the suspension to known bentonite proportions and reading the Holven-Gillett turbidity at each stage of dilution.

(3) Samples of the suspension were treated with various proportions of the earth used in making the above agent, but without the addition of the salt, and the flow-rates and turbidities were determined as above described.

(4) Samples of the suspension were treated with constant quantities of an agent made from the above materials but containing gradually decreasing proportions of the flocculating salt, the samples filtered under the same conditions, and the flow-rates and turbidities taken.

(5) A single sample of the suspension was treated with the maximum dose of the flocculating salt used in the above experiments, without the addition of earth, and the same observations made.

The results of these experiments are recorded in tabular form immediately below:

| Expt. | Agents Added | | | Flow-Rate, Gallons | Turbidity, P. P. M. |
|---|---|---|---|---|---|
| | Earth | Salt | Total | | |
| | Per cent | Per cent | Per cent | | |
| 1 | 0.0000 | 0.0000 | 0.0000 | 401 | 50.0 |
| 2a | 0.1950 | 0.0050 | 0.2000 | 153 | 0.4 |
| 2b | 0.0975 | 0.0025 | 0.1000 | 134 | 0.5 |
| 2c | 0.0487 | 0.0013 | 0.0500 | 201 | 12.5 |
| 3a | 2.0000 | 0.0000 | 2.0000 | 368 | 4.0 |
| 3b | 1.0000 | 0.0000 | 1.0000 | 401 | 4.8 |
| 3c | 0.6000 | 0.0000 | 0.6000 | 390 | 5.3 |
| 3d | 0.1900 | 0.0000 | 0.1900 | 327 | 9.0 |
| 4a | 0.1950 | 0.0050 | 0.2000 | 134 | 0.3 |
| 4b | 0.1975 | 0.0025 | 0.2000 | 147 | 0.3 |
| 4c | 0.1988 | 1.0012 | 0.2000 | 210 | 0.3 |
| 4d | 0.1994 | 0.0006 | 0.2000 | 237 | 4.2 |
| 5 | 0.0000 | 0.0050 | 0.0050 | 327 | 7.8 |

As the turbidity of a satisfactory industrial or domestic water should not much exceed 1.0 on the Holven-Gillett instrument (=1.3 P. P. M. on the bentonite scale) it will be evident from the above figures that neither the earth alone nor the floc alone even approaches a commercial result when used in any feasible quantity. When combined, however, they give high clarities with very small doses: of the order of $\frac{1}{5}$ of 1% earth with $\frac{1}{400}$ of 1% of aluminum sulfate, or of $\frac{1}{10}$ of 1% of earth with $\frac{1}{800}$ of 1% of the salt. The relation of about 1 part salt to 40 parts earth is the most economical, at least for this particular earth and water. It will be noted that the filtration of water rendered highly turbid with bentonite is a difficult problem and that the total dosage of agent will be materially less in the filtration of river and other waters in which the turbidity is mainly due to solids less colloidal than bentonite.

It is seldom if ever necessary to use more than 0.05% by weight of earth in this method, a quantity equivalent to about 4 pounds per 1,000 gallons of water clarified, nor more than $1/40$ of this quantity or 0.1 pound of the salt per 1,000 gallons. Good results may often be had with doses of earth as small as 0.1 pound per 1,000 gallons, and with a quantity of the salt as low as 0.005 pound per 1,000 gallons of water. The range of proportions in which the clarifying agents may be used is not less than 0.1 pound of diatomaceous earth per 1,000 gallons of water and preferably not more than 4 pounds. The aluminum sulfate is used in the proportion of about 0.005 to about 0.1 pound per 1,000 gallons of water.

In the filtration of steam engine condensate to fit it for reuse as boiler feed water the filtration system illustrated in Fig. 8 may be used.

Referring to this drawing, which is a diagram only and shows no unnecessary detail: the condensed water, which may contain up to 100 parts per million of cylinder lubricating oil in a state of extreme dispersion, is received in any tank 70. A pump 71, capable of lifting at least 50 pounds pressure, discharges a stream of the cloudy condensate into a filtering shell 72 which is divided into compartments 73 and 74 by a horizontal partition 75. From this partition a plurality of bootleg filters 76 are projected downwardly, being closed at their lower ends and opening upwardly into compartment 74. The bootlegs are often made in cylindrical form but are here illustrated as flat leaves. As shown in Fig. 9, each leaf consists of a grill 77 of narrow metallic strips, the grill being faced with perforated sheet metal 78 and covered with layers 79 of a stiff wire mesh and 80 of filter cloth. This assembly may be flanged as at 81 to be inserted through an opening in partition 75. Perforations 82 are provided to permit liquid passing through the cloth to the interior of the grill to flow upwardly into upper compartment 74.

In this compartment some oil may separate as a clean upper layer which may be withdrawn from time to time by opening a purge valve 83. The once filtered water, which often will still contain some finely dispersed oil, passes through conduit 84 into a second filtering unit 85 of the same construction as that above described. This unit has an oil purge valve in the upper compartment as at 87.

The twice filtered water, which should now be free from finely divided oil but will contain oil globules in suspension, passes from unit 85 through conduit 88 to a wetted septum separator by which the globules are coalesced to form a liquid body. A convenient form for this element is that of a cylindrical tank 89 having within it a cylinder 90 of heavy wire mesh covered with Turkish towelling or so-called terry cloth. The water passes from the space outside the cloth cylinder through the cloth and into the inner compartment, the oil adhering to the cloth and being forced through it to rise to the surface. The separated oil may be drained through a valved outlet 93 while the water passes continuously through a bottom outlet 94 so arranged as to maintain the tank constantly filled with liquid.

In the use of this apparatus the filter leaves are precoated with a filter-aid, such as finely comminuted diatomaceous earth, having the property of agglomerating the extremely minute suspended oil particles into globules large enough to separate by gravitation. For this purpose a slurry tank 95 is provided with an air jet 96 or other means for agitating the powdered filter-aid with water, and is arranged to feed into the suction of pump 71 as at 97. A desired quantity of the filter-aid, brought to the condition of a thin slurry, is fed into the first filtering unit 72 in which it forms a coating on all of the filter leaves simultaneously. As only clear water passes through to the second unit 85 a branch feed pipe 98 and diversion valves 99, 100 and 101 are provided to bypass the first unit and feed slurry directly into unit 85.

In passing through the successive units of the system, all of the suspended oil particles, which initially are too small to separate by gravitation in any feasible time, are coalesced into larger oil particles or globules capable of being agglomerated into an oil body by the wetted septum. Provided the filter-aid is sufficiently effective for this purpose, the back pressure on the pump discharge builds up very slowly and a large quantity of water may be treated by a single precoat before the maximum pressure for which the system is designed is reached. This operation differs from the filtration of domestic or industrial water previously described in that, after the cake becomes saturated, the liquid suspensoid to be separated from the water is not retained on or in the filter cake, but is passed through it to be parted from the water in a final stage of gravity separation. Thus there is no need for adding filter-aid to the water during the filtering cycle, which will not be lengthened thereby, and the original precoat is effective until it becomes choked by emulsion particles which the filter-aid is unable to resolve. In this operation the effectiveness of the filter-aid is measured, first by its ability completely to coalesce the suspended oil and to deliver a water free from turbidity, second, by the length of time which elapses before the precoat becomes choked at any given throughput per square foot of filtering area.

The agent above described has been found to be highly effective for the treatment of condensed water containing suspended oil. In the following experiment a test filtering assembly having a total of 25 square feet surface was fed at the rate of 1½ gallons per square foot per minute with a steam engine condensate containing 70 parts per million of steam cylinder oil, the feed temperature being maintained at 125° F.

The leaves were first precoated with a diatomaceous earth filter-aid of good quality, the quantity applied being 2.46 ounces per square foot of cloth surface. The feed was then started and the rise in pressure observed hourly at gauge 102, this gauge indicating the back pressure of the entire system. As shown by curve 1 of Fig. 10, the pressure rose so rapidly that the limit pressure was approached in four hours, at which time the use of this earth was discontinued.

The leaves were then cleaned and again precoated with an example of the agent of the invention, the same grade of diatomaceous earth filter-aid intermixed with 2.5% by weight of aluminum sulfate. This run was continued for 48 hours, at the same feed rate as in the first test, at the end of which time the pressure on gauge 102 had risen to 29 pounds, as shown by curve 2 of Fig. 10. Curve 3 of this figure shows the pressure curve for gauge 103, indicating the back pressure of the second filtering unit plus that of the wetted septum separator, while curve 4 shows the pressure curve for gauge 104, the back pressure of the separator alone.

In this experiment each square foot of filtering surface clarified 4320 gallons of water with the use of 2.46 ounces of the mixed agent, or at the rate of 28,000 gallons of water per pound. As the pressure throughout this test advanced in substantially a straight line, and had risen only 17 pounds in 48 hours, the indications are that at least double this quantity of water would have been treated before the pressure rose to the 50 pounds for which this test set was designed.

Curve 5 of Fig. 10 shows the rise in pressure (for the entire system) when ferrous sulfate was used as the flocculating element of the mixed agent in place of aluminum sulfate. The rise in pressure was more rapid than in the first experiment and the final throughput would have been less, but the result was commercially valuble. In all of these experiments the clarity of the effluent water was such as corresponded with an oil content not exceeding 0.2 part per million.

I claim as my invention:

1. The method of clarifying a turbid water which consists in substantially simultaneously adding to said water agents consisting essentially of a diatomaceous earth filter-aid and a minor quantity of aluminum sulfate, the ratio of aluminum sulfate being about 0.5 to about 5 parts per hundred parts of diatomaceous earth and the proportion of said diatomaceous earth being not less than 0.1 pound and of said aluminum sulfate being in the range of 0.005 to 0.1 pound per 1,000 gallons of water whereby a gelatinous coating is formed on the particles of said filter-aid solely by the interaction of said salt with naturally occurring components of said water, and thereafter filtering from said water said coated particles and suspensoids entrained thereby.

2. A method for clarifying potable water which consists in adding to said water a small proportion of a mixture consisting essentially of diatomaceous earth and a salt capable of forming a flocculent precipitate in said water said salt being selected from the group consisting of the sulfates of aluminum and iron, the proportions of salt to diatomaceous earth being in the range of about 0.5 to 5 parts weight of salt per 100 parts of diatomaceous earth in a proportion not less than 0.1 pound of the mixture per 1,000 gallons of water, and thereafter pressure filtering the suspensoids from said water.

3. A process for clarifying water which comprises adding to said water a filter aid consisting essentially of diatomaceous earth and aluminum sulfate intimately admixed, the proportions of aluminum sulfate to diatomaceous earth being in the range of about 0.5 to about 5 parts by weight per 100 parts by weight of diatomaceous earth the mixture being added in the proportion of not less than 0.1 pound per 1,000 gallons of water and thereafter pressure filtering said water.

4. A process for clarifying water which comprises adding to said water a filter aid consisting essentially of diatomaceous earth and iron sulfate intimately admixed, the proportions of iron sulfate to diatomaceous earth being in the range of about 0.5 to about 5 parts by weight per 100 parts by weight of diatomaceous earth, the mixture being added in the proportion of not less than 0.1 pound per 1,000 gallons of water and thereafter pressure filtering said water.

5. A method of clarifying turbid water which consists in simultaneously adding to said water clarifying agents consisting essentially of a diatomaceous earth filter aid and a minor quantity of salt, said salt being selected from the group consisting of the sulfates of aluminum and iron, said diatomaceous earth being in the proportion of not less than 0.1 pound and said salt being in the proportion of about 0.005 to about 0.1 pound per 1,000 gallons of water, whereby a gelatinous coating is formed on the particles of said filter aid solely by the interaction of said salt with naturally occurring components of said water, and thereafter pressure filtering from said water said coated particles and suspensoids entrained thereby.

CHARLES A. FRANKENHOFF.

REFERENCES CITED

The following references are of record in the file of this patent:

UNITED STATES PATENTS

| Number | Name | Date |
|---|---|---|
| 398,261 | Johnson | Feb. 19, 1889 |
| 729,775 | Krause | June 2, 1903 |
| 1,242,784 | Dyer et al. | Oct. 9, 1917 |
| 1,501,877 | Zoul | July 15, 1924 |
| 1,502,547 | Calvert | July 22, 1924 |
| 1,547,712 | Zoul | July 28, 1925 |
| 1,579,171 | Zoul | Mar. 30, 1926 |
| 1,616,119 | Fleeger et al. | Feb. 1, 1927 |
| 1,713,250 | Blemenberg, Jr. | May 14, 1929 |
| 1,753,277 | Sweetland | Apr. 8, 1930 |
| 2,036,258 | Cummins | Apr. 7, 1937 |
| 2,040,818 | Badollet | May 19, 1936 |
| 2,294,697 | Seip | Sept. 1, 1942 |
| 2,317,961 | Tischner | Apr. 27, 1941 |
| 2,338,987 | Watzel | Jan. 11, 1944 |
| 2,347,927 | Paterson et al. | May 2, 1944 |
| 2,363,009 | Lewis | Nov. 21, 1944 |